(12) United States Patent
Mizusawa

(10) Patent No.: US 11,397,879 B2
(45) Date of Patent: Jul. 26, 2022

(54) INFORMATION PROCESSING APPARATUS, ADJUSTING APPARATUS, INFORMATION PROCESSING METHOD, ADJUSTING METHOD, AND NON-TRANSITORY COMPUTER-READABLE STORAGE MEDIUM STORING PROGRAM

(71) Applicant: SEIKO EPSON CORPORATION, Tokyo (JP)

(72) Inventor: Nobutada Mizusawa, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/201,653

(22) Filed: Mar. 15, 2021

(65) Prior Publication Data

US 2021/0295119 A1 Sep. 23, 2021

(30) Foreign Application Priority Data

Mar. 18, 2020 (JP) .............................. JP2020-047314

(51) Int. Cl.
*H04N 1/40* (2006.01)
*G06K 15/02* (2006.01)
*G06K 15/10* (2006.01)

(52) U.S. Cl.
CPC ......... *G06K 15/027* (2013.01); *G06K 15/102* (2013.01); *G06K 15/1805* (2013.01)

(58) Field of Classification Search
CPC .............. G06K 15/027; G06K 15/102; G06K 15/1805; G06K 15/026; H04N 1/6033; H04N 1/6044; B41J 29/393
See application file for complete search history.

(56) References Cited

U.S. PATENT DOCUMENTS

2005/0270321 A1* 12/2005 Ono ..................... H04N 1/6033
                                                                 347/14
2016/0171348 A1*  6/2016 Satoh ................. H04N 1/00087
                                                                 347/110
2016/0301830 A1* 10/2016 Shibata ............. H04N 1/00323

FOREIGN PATENT DOCUMENTS

JP            2005-262757         9/2005

* cited by examiner

*Primary Examiner* — Moustapha Diaby
(74) *Attorney, Agent, or Firm* — Workman Nydegger

(57) ABSTRACT

An information processing apparatus includes: a print data generating section that generates print data of a color chart in which a plurality of patches are arranged and which includes an identification patch indicating a printing condition of a printing apparatus when the color chart is printed; and a printing control section that enables the printing apparatus to print the print data of the color chart that varies depending on the printing condition.

12 Claims, 9 Drawing Sheets

- 41 — MODEL IDENTIFICATION NUMBER
- 42 ─┐
- 43 ─┤ INDIVIDUAL IDENTIFICATION NUMBER
- 44 ─┘
- 45 — DOT SIZE
- 46 — VOLTAGE OFFSET
- 47 — ADJUSTMENT TARGET CHIP GROUP
- 48 — INK TYPE
- 49 — PENETRANT LIQUID REPLACEMENT INFORMATION

FIG. 7

| | |
|---|---|
| C | 1 |
| M | 2 |
| Y | 3 |
| Red | 4 |
| Green | 5 |
| Blue | 6 |
| Bk | 7 |

INFORMATION PROCESSING APPARATUS, ADJUSTING APPARATUS, INFORMATION PROCESSING METHOD, ADJUSTING METHOD, AND NON-TRANSITORY COMPUTER-READABLE STORAGE MEDIUM STORING PROGRAM

The present application is based on, and claims priority from JP Application Serial Number 2020-047314, filed Mar. 18, 2020, the disclosure of which is hereby incorporated by reference herein in its entirety.

BACKGROUND

1. Technical Field

The present disclosure relates to an information processing apparatus, an adjusting apparatus, an information processing method, an adjusting method, and a non-transitory computer-readable storage medium storing a program.

2. Related Art

Printers of a related art include a printing head constituted by a plurality of chips. Since there are variations in manufacturing of the plurality of chips, the chips slightly differ from each other in the weight of ink even when the same voltage is applied to piezoelectric elements of the chips. A change over time of the printing head or a change in viscosity of ink according to temperature and humidity in a usage environment also causes a difference in the weight of ink even when the same voltage is applied. Although the difference in the weight of ink is able to be adjusted in a shipping process, improving accuracy of adjustment requires expensive machines and materials and a lot of time and effort, and it is difficult to perform adjustment with high accuracy. The difference in the weight of ink causes a difference in density, causes density unevenness called banding as a result of printing, and results in a deterioration in image quality.

As techniques of correcting such a difference in density, JP-A-2005-262757 discloses a technique of printing a patch for density correction on a printing medium, reading a pattern for density correction by using a colorimeter, and correcting the density, that is, the ejection amount of ink based on the reading result.

However, since an increase in the number of patches takes time and effort and results in an increase in the number of mistakes, a method enabling efficient adjustment is desired.

SUMMARY

To achieve an advantage of the disclosure, an information processing apparatus according to an aspect includes: a print data generating section that generates print data of a color chart in which a plurality of patches are arranged and which includes an identification patch indicating a printing condition of a printing apparatus when the color chart is printed; and a printing control section that enables the printing apparatus to print the print data of the color chart that varies depending on the printing condition.

An adjusting apparatus according to another aspect includes: an acquiring section that acquires a reading result by a colorimeter regarding a color chart in which a plurality of patches are arranged and which varies depending on a printing condition of the color chart; a specifying section that specifies, based on a result acquired by the acquiring section, the printing condition; and an adjustment value generating section that generates, based on the printing condition, an adjustment value of an ejection amount of ink ejected from a nozzle array of a printing head.

An information processing method according to another aspect includes: a print data generating step of generating print data of a color chart in which a plurality of patches are arranged and which includes an identification patch indicating a printing condition of a printing apparatus when the color chart is printed; and a printing control step of enabling the printing apparatus to print the print data of the color chart that varies depending on the printing condition.

An adjusting method according to another aspect includes: an acquiring step of acquiring a reading result by a colorimeter regarding a color chart in which a plurality of patches are arranged and which includes an identification patch indicating a printing condition of a printing apparatus when the color chart is printed; a specifying step of specifying, based on a result acquired in the acquiring step, the printing condition; and an adjusting step of adjusting, based on the printing condition, an amount of ink ejected from a nozzle array of a printing head.

In a non-transitory computer-readable storage medium storing a program according to another aspect, the program causes a computer to function as: a print data generating section that generates print data of a color chart in which a plurality of patches are arranged and which includes an identification patch indicating a printing condition of a printing apparatus when the color chart is printed; and a printing control section that enables the printing apparatus to print the print data of the color chart that varies depending on the printing condition.

In a non-transitory computer-readable storage medium storing a program according to another aspect, the program causes a computer to function as: an acquiring section that acquires a reading result by a colorimeter regarding a color chart in which a plurality of patches are arranged and which includes an identification patch indicating a printing condition of a printing apparatus when the color chart is printed; a specifying section that specifies, based on a result acquired by the acquiring section, the printing condition; and an adjusting section that adjusts, based on the printing condition, an amount of ink ejected from a nozzle array of a printing head.

BRIEF DESCRIPTION OF THE DRAWINGS

FIG. 6 is a view for explaining identification patches.

FIG. 7 is a view for explaining identification patches.

DESCRIPTION OF EXEMPLARY EMBODIMENTS

Here, an embodiment of the disclosure will be described in the following order:
(1) Configuration of printing adjusting system;
(2) Printing processing;
(3) Color measurement processing;
(4) Adjustment value generation processing; and
(5) Other embodiments.

(1) Configuration of Printing Adjusting System

Figure 1:
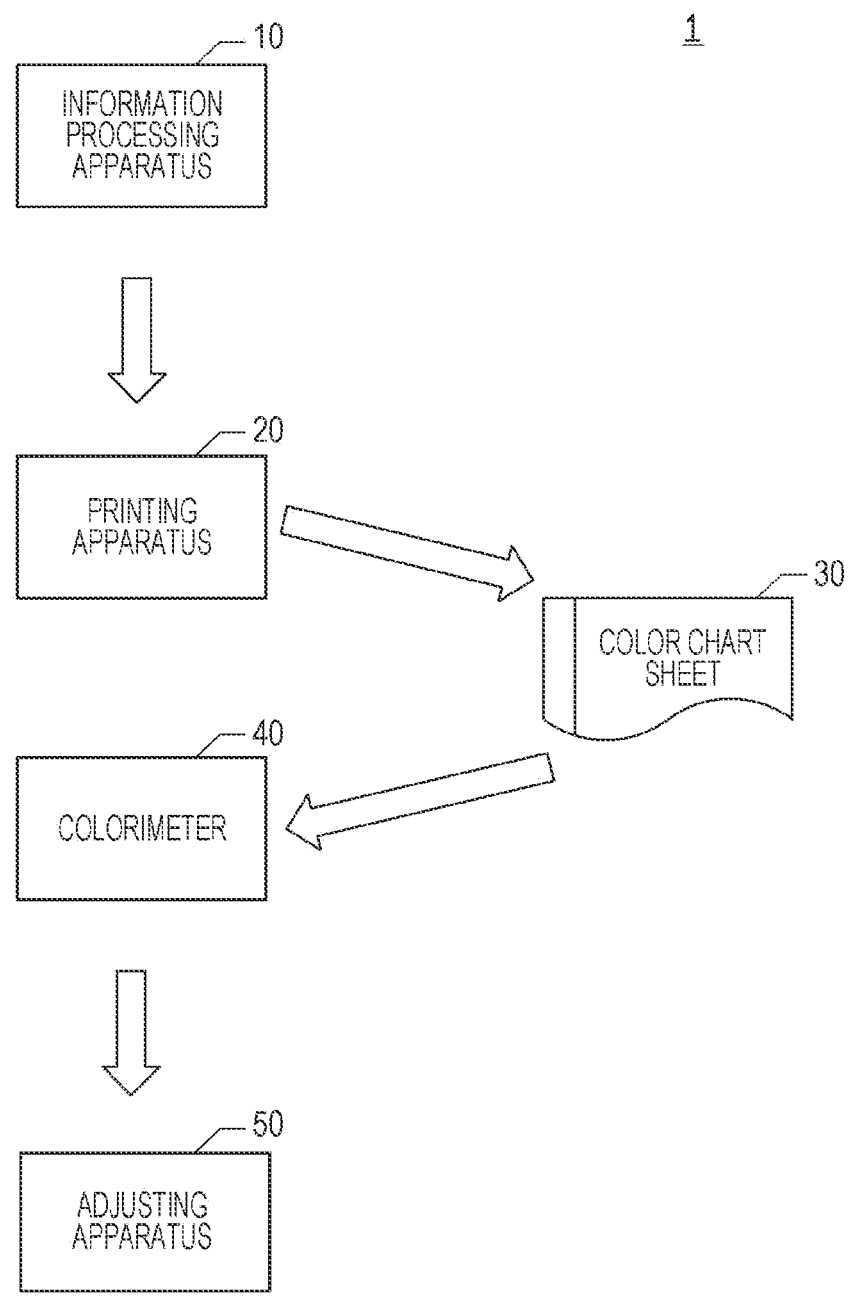
FIG. 1 illustrates an overall configuration of a printing adjusting system.

FIG. 1 illustrates an overall configuration of a printing adjusting system 1. The printing adjusting system 1 includes an information processing apparatus 10, a printing apparatus 20, a colorimeter 40, and an adjusting apparatus 50. The printing adjusting system 1 adjusts the ejection amount of ink when an ink jet printing apparatus 20 performs printing, that is, adjusts a voltage applied to a piezoelectric element provided in a printing head. The printing apparatus 20 of the present embodiment is defined as an ink jet digital printing machine.

The information processing apparatus 10 transmits, to the printing apparatus 20, print data of a color chart sheet 30 which is used for adjusting the ejection amount of the ink of the printing apparatus 20, that is, the voltage applied to the piezoelectric element. The color chart sheet 30 includes a plurality of color charts. The respective color charts included in the color chart sheet 30 are used to adjust the ejection amount of the ink of the printing apparatus 20, that is, the voltage applied to the piezoelectric element of the printing head of the printing apparatus 20. The printing apparatus 20 prints the color chart sheet 30. The colorimeter 40 performs color measurement on each of the color charts of the color chart sheet 30, and the color measurement result is input to the adjusting apparatus 50. The adjusting apparatus 50 generates a voltage adjustment value corresponding to the ejection amount of the ink of the printing apparatus 20 based on the color measurement result.

Figure 2:
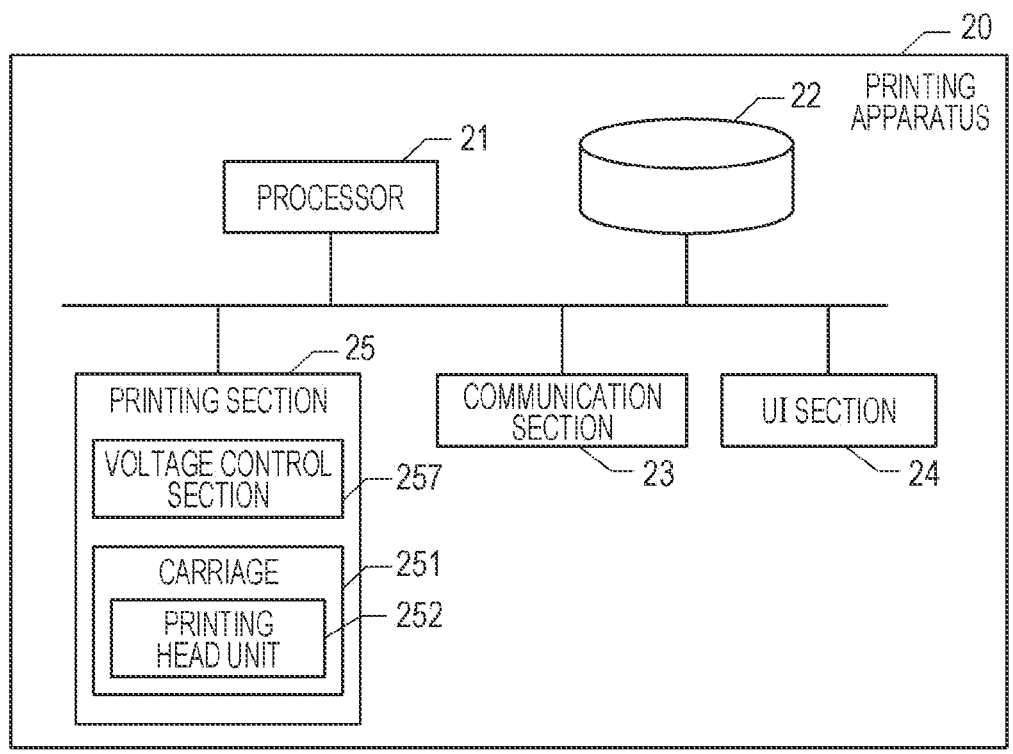
FIG. 2 illustrates a configuration of a printing apparatus.

FIG. 2 illustrates a configuration of the printing apparatus 20. The printing apparatus 20 includes a processor 21, non-volatile memory 22, a communication section 23, a UI section 24, and a printing section 25. The processor 21 includes a CPU, a ROM, a RAM, and the like (none of which is illustrated) and is able to control the respective sections of the printing apparatus 20 by executing various programs recorded on the non-volatile memory 22. Note that the processor 21 may be constituted by a single chip or a plurality of chips. Moreover, the processor 21 may adopt, for example, an ASIC instead of the CPU or may be constituted by cooperation of the CPU and an ASIC.

The communication section 23 includes a communication interface for communicating with external devices in accordance with various wired or wireless communication protocols. The communication section 23 also includes an interface for communicating with various kinds of removable memory attached to the printing apparatus 20. The printing apparatus 20 is able to communicate with the information processing apparatus 10 via the communication section 23.

The UI section 24 includes a touch panel display, various keys and switches, and the like. The touch panel display includes a display panel on which various kinds of information are displayed in accordance with control of the processor 21 and a touch detecting panel overlaid on the display panel and detects a touch operation with a finger of a person or the like. The processor 21 is able to obtain operation content of a user via the UI section 24. The processor 21 is also able to display various kinds of information on the touch panel display of the UI section 24 and notify the user of the information.

The printing section 25 performs ink jet printing. The printing section 25 performs printing according to print data received from the information processing apparatus 10, in accordance with control of the processor 21. The printing section 25 has a carriage 251 and a voltage control section 257. The carriage 251 has a printing head unit 252 that ejects ink.

Figure 3:
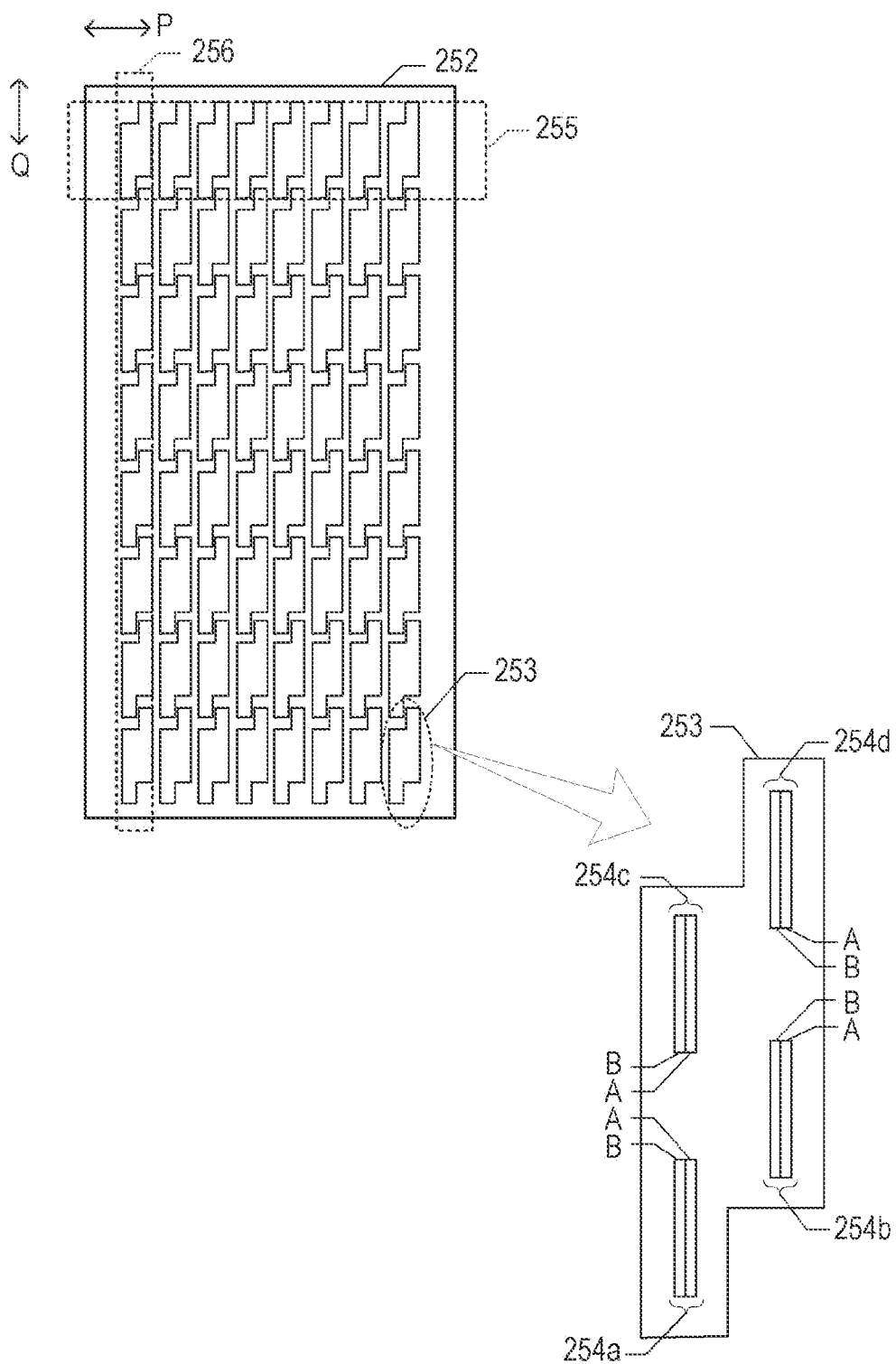
FIG. 3 illustrates a configuration of a printing head.

FIG. 3 illustrates the printing head unit 252. The printing head unit 252 has sixty-four printing heads 253. In the printing head unit 252, eight printing head rows 255 are arranged at an equal gap in a sub-scanning direction Q, and eight printing head columns 256 are arranged at an equal gap in a main scanning direction P. Here, the main scanning direction P is a direction in which the printing head unit 252 moves, and the sub-scanning direction Q is a direction in which the printing medium is transported. The printing head rows 255 each include eight printing heads 253, and the printing head columns 256 each include eight printing heads 253. The printing heads 253 each include four chips 254a, 254b, 254c, and 254d. The chips 254a, 254b, 254c, and 254d each include two nozzle arrays A and B.

Figure 4:
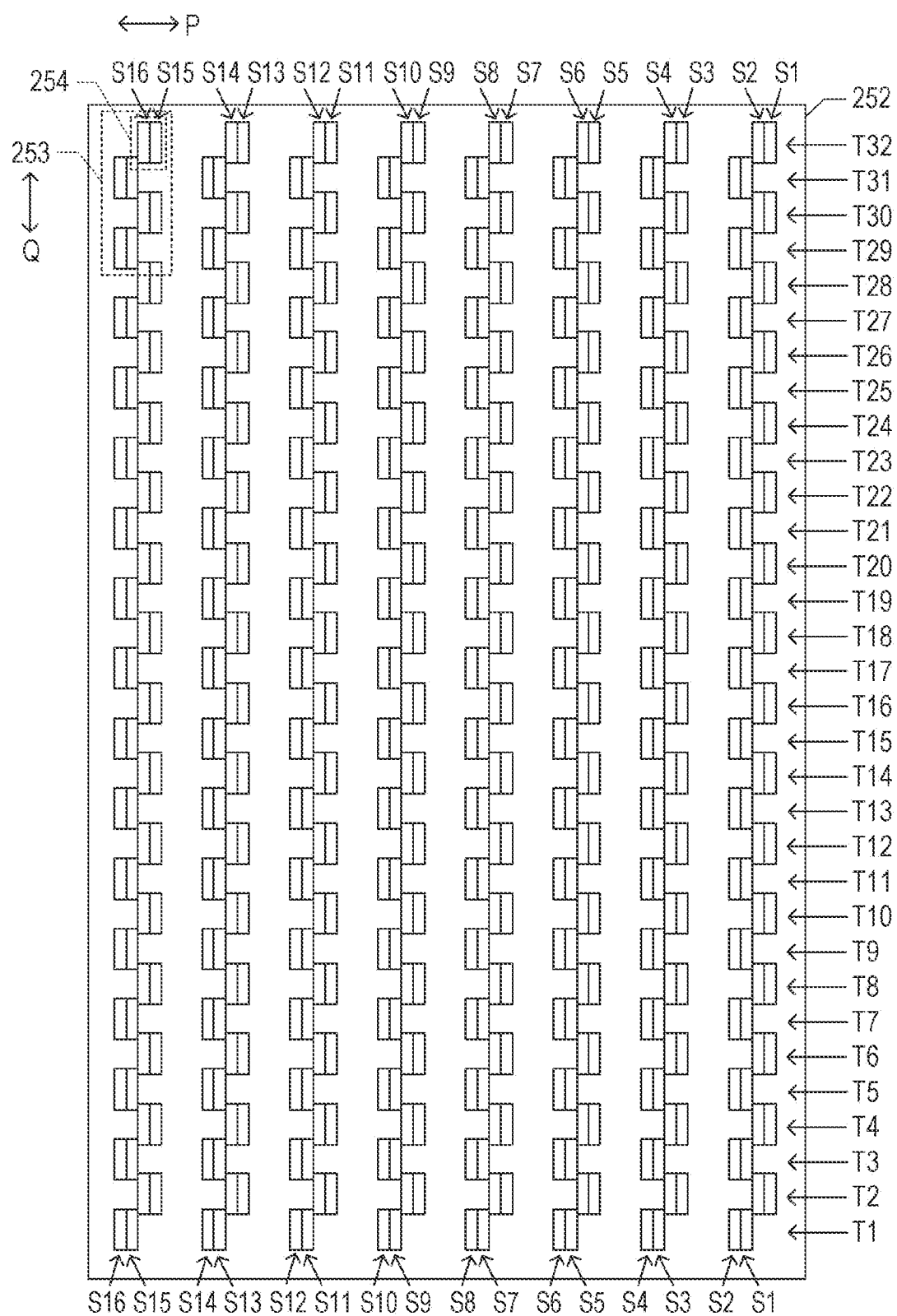
FIG. 4 illustrates a configuration of the printing head.

FIG. 4 illustrates nozzle arrays included in the printing heads of the printing head unit 252. FIG. 4 schematically illustrates a total of 512 nozzle arrays 254 that are included in the (8×8) printing heads 253 included in the printing head unit 252.

The eight printing head columns 256 each include arrangements of two nozzle arrays A and B. The arrangement of nozzle arrays A included in the respective printing head columns 256 is referred to as a nozzle array arrangement A. Further, the arrangement of nozzle arrays B included in the respective printing head columns 256 is referred to as a nozzle array arrangement B. Here, the nozzle array arrangement A includes nozzle arrays A of the four chips 254a to 254d of each of the eight printing heads 253 included in the printing head column 256 to which the nozzle array arrangement A belongs. Similarly, the nozzle array arrangement B includes nozzle arrays B of the four chips 254a to 254d of each of the eight printing heads 253 included in the printing head column 256 to which the nozzle array arrangement B belongs.

Eight nozzle array arrangements A and eight nozzle array arrangements B are alternately arranged side by side in the main scanning direction P, and the respective nozzle array arrangements are assigned sixteen numbers S of S1 to S16 in the main scanning direction P as illustrated in FIG. 4. The numbers S serve as information for identifying the respective nozzle array arrangements. The nozzle array arrangements S1 to S16 correspond to yellow, orange, red, blue, gray, magenta, cyan, black, black, cyan, magenta, gray, blue, red, orange, and yellow, respectively.

The eight printing heads 253 included in each of the printing head columns 256 each include the four chips 254a to 254d. That is, the printing head columns 256 each includes thirty-two chips. As illustrated in FIG. 4, the thirty-two chips included in the printing head column 256 are assigned numbers T of T1 to T32 in the sub-scanning direction Q. The numbers T serve as information for identifying the thirty-two chips in the same printing head column 256. The voltage control section 257 controls the voltage applied to the piezoelectric element provided so as to correspond to each of the nozzle arrays included in the printing head unit 252.

Figure 5:
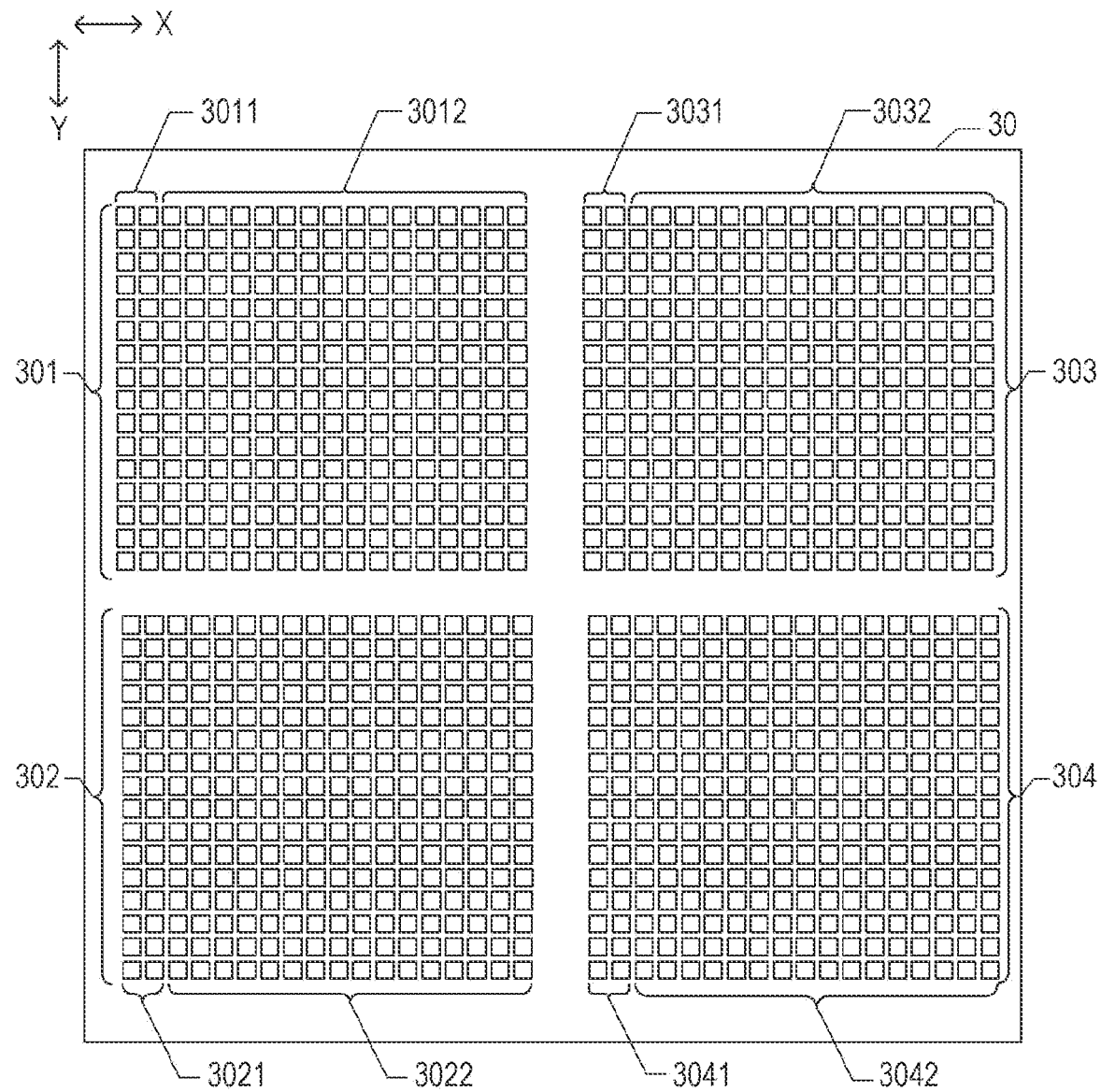
FIG. 5 illustrates an example of a color chart.

FIG. 5 illustrates an example of the color chart sheet 30 printed by the printing apparatus 20 of the present embodiment. In the present embodiment, the color chart sheet 30 is printed on an A2-size printing medium. Four kinds of color charts are arranged in a total of four regions which are formed by dividing the color chart sheet 30 to two in both the vertical and horizontal directions. A color chart 301 is arranged in the upper-left region of the color chart sheet 30. A color chart 302 is arranged in the lower-left region of the color chart sheet 30. A color chart 303 is arranged in the upper-right region of the color chart sheet 30. A color chart 304 is arranged in the lower-right region of the color chart sheet 30.

A plurality of patches are arranged in the color chart 301. The patches are each a quadrangular image and are arranged vertically and horizontally at an equal gap in the color chart 301. The same is applicable to the color charts 302 to 304, and a plurality of patches are arranged vertically and horizontally at an equal gap.

The color charts 301 and 302 are color charts corresponding to a dot size L, and the color charts 303 and 304 are color charts corresponding to a dot size S. The printing apparatus 20 is able to control the ejection amount of the ink by controlling a waveform of the voltage applied to the piezoelectric element. The dot size L is a large dot size corresponding to the ink when the amount thereof is large, and the dot size S is a small dot size corresponding to the ink when the amount thereof is small.

The color charts 301, 302, 303, and 304 respectively include identification patch regions 3011, 3021, 3031, and 3041 and color patch regions 3012, 3022, 3032, and 3042. The identification patch regions 3011, 3021, 3031, and 3041 are regions in which identification patches are arranged. Each of the identification patch regions 3011, 3021, 3031, and 3041 is formed by patches of two columns from the left end of corresponding one of the color charts 301, 302, 303, and 304. The identification patches are patches indicating printing conditions. The color patch regions 3012, 3022, 3032, and 3042 are regions in which color patches are arranged. Each of the color patch regions 3012, 3022, 3032, and 3042 is formed by patches of sixteen columns from the right end of corresponding one of the color charts 301, 302, 303, and 304. The color patches are patches used in voltage adjustment.

First, the identification patch regions 3011, 3021, 3031, and 3041 will be described. The printing conditions include a model identification number and an individual identification number of the printing apparatus 20, a dot size used when the printing apparatus 20 prints a color chart, a voltage offset, an adjustment target chip group, a type of ink to be ejected, and penetrant liquid replacement information. Set values corresponding to such set items are represented by identification patches.

The set values of the model identification number and the individual identification number are numerals of a given digit. The set value of the dot size is any of L and S. The set value of the voltage offset is any of −2 V, 0 V, and +2 V. The adjustment target chip group is any of a group of first to sixteenth chips and a group of seventeenth to thirty-second chips. The set value of the type of ink to be ejected in the printing apparatus 20 is any of, for example, a reactive ink, a dispersion ink, an acidic ink, and a pigment ink. Colored ink that is ejection liquid ejected from a given nozzle of the printing apparatus 20 may be replaced with ejection liquid such as penetrant liquid other than colored ink. The set value of the penetrant liquid replacement information is information for identifying the nozzle, for which replacement is performed, and ejection liquid after the replacement. In this manner, the printing conditions include a condition about whether or not ejection liquid other than colored ink used in color printing is used for printing a color patch.

FIG. 6 illustrates a relationship between a position of an identification patch in an identification patch region and a printing condition. As illustrated in FIG. 6, in each of the identification patch regions 3011, 3021, 3031, and 3041, a model identification number is assigned to an identification patch at an arrangement position 41. An individual identification number is assigned to three identification patches at arrangement positions 42 to 44. A dot size is assigned to an identification patch at an arrangement position 45. A voltage offset is assigned to an identification patch at an arrangement position 46. An adjustment target chip group is assigned to an identification patch at an arrangement position 47. An ink type is assigned to an identification patch at arrangement position 48. Penetrant liquid replacement information is assigned to an identification patch at arrangement position 49. In this manner, the arrangement positions of identification patches corresponding to the set items of the printing conditions are determined in advance.

FIG. 7 illustrates how colors of identification patches are associated with information. Given information is assigned to the respective colors. In the example of FIG. 7, 1 is associated with cyan (C), and 2 is associated with magenta (M). In this manner, an arrangement position of an identification patch corresponds to a set item, and a color of the identification patch corresponds to a set value. That is, in the color chart sheet 30, set values corresponding to the respective set items of the printing conditions are indicated by the arrangement positions and colors of the identification patches. Further, one set value may be represented by a combination of colors of a plurality of identification patches as in the individual identification number.

Note that the number and types of the set items indicated in an identification patch region are not limited to those in the embodiment. Moreover, the number of identification patches used for indicating a printing condition in an identification patch region is not limited to that in the embodiment. An identification patch indicating no setting is assigned at an arrangement position in which an identification patch indicating a printing condition is not arranged.

Next, the color patch regions 3012, 3022, 3032, and 3042 will be described. 512 nozzle arrays included in the printing head unit 252 are divided into a first group of T1 to T16 and a second group of T17 to T32. Color patches corresponding to nozzle arrays 254 of the first group are arranged in the color patch regions 3012 and 3032 of the color charts 301 and 303, and color patches corresponding to nozzle arrays 254 of the second group are arranged in the color patch regions 3022 and 3042 of the color charts 302 and 304.

Sixteen patches arranged in the horizontal direction X of each of the color charts 301, 302, 303, and 304 correspond to the nozzle arrays of S1 to S16. Sixteen color patches arranged in the vertical direction Y of each of the color charts 301 and 303 correspond to nozzle arrays of T1 to T16. Sixteen color patches arranged in the vertical direction Y of each of the color charts 302 and 304 correspond to nozzle arrays of T17 to T32. Here, the horizontal direction X extends in a direction in which the printing medium is discharged, and the vertical direction Y is a direction vertical to the horizontal direction X. Voltage characteristics differ between nozzle arrays. Thus, for voltage adjustment, patches corresponding to all the nozzle arrays are arranged in the color chart sheet 30.

Further, the printing adjusting system 1 of the present embodiment creates, for voltage adjustment, the color chart sheet 30 corresponding to each of three offset voltage values of −2 V, 0 V, and +2 V. That is, the printing adjusting system 1 prints three sheets of the color chart sheet 30 illustrated in FIG. 5. Voltage adjustment will be described later.

Figure 8:
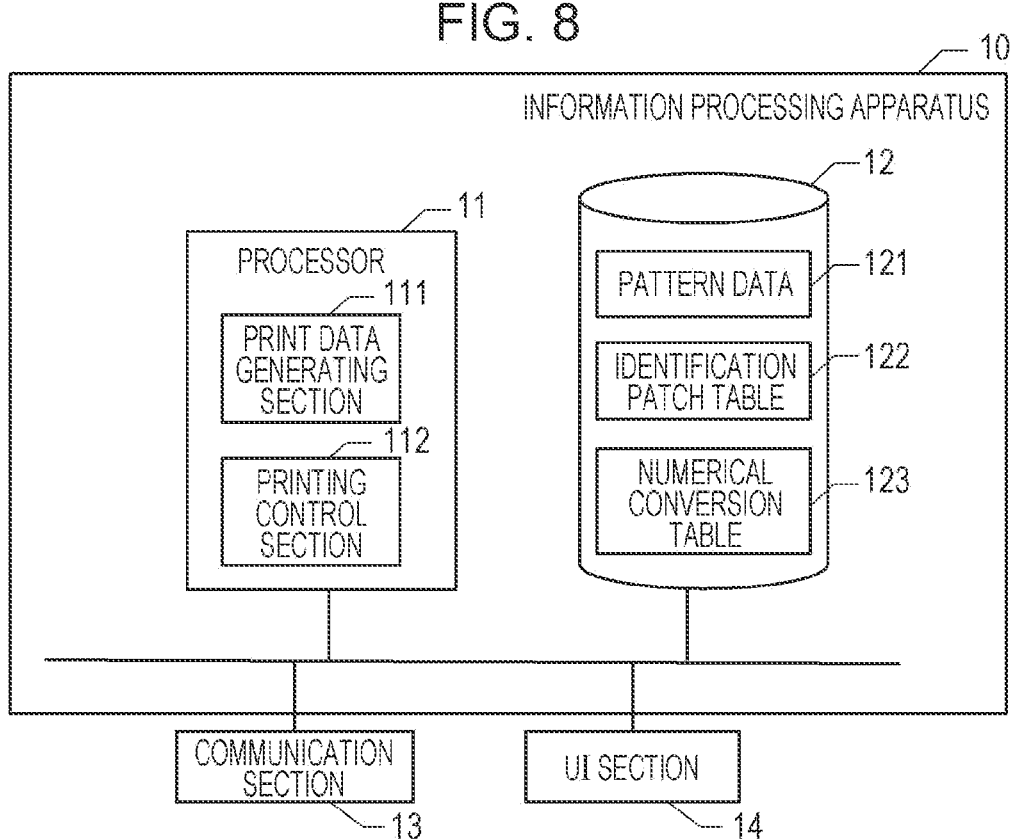
FIG. 8 illustrates a configuration of an information processing apparatus.

FIG. 8 illustrates a configuration of the information processing apparatus 10. The information processing apparatus 10 includes a processor 11, non-volatile memory 12, a communication section 13, and a UI section 14. The processor 11 includes a CPU, a ROM, a RAM, and the like (none of which is illustrated) and is able to control the respective sections of the information processing apparatus 10 by executing various programs recorded on the non-volatile memory 12. Note that the processor 11 may be constituted by a single chip or a plurality of chips. Moreover, the processor 11 may adopt, for example, an ASIC instead of the CPU or may be constituted by cooperation of the CPU and an ASIC.

The non-volatile memory 12 stores pattern data 121. The pattern data 121 is data used for printing the color chart sheet 30. The pattern data 121 includes information indicating a correspondence relationship between the arrangement positions of the respective patches of the color chart sheet 30 and the nozzle arrays forming the respective patches. Thereby, the patches corresponding to the respective nozzle arrays are formed. The pattern data 121 further includes information indicating a correspondence relationship between the arrangement positions of the identification patches in an identification patch region and the set items of the printing conditions, which has been described with reference to FIG. 6.

The non-volatile memory 12 also stores an identification patch table 122. The identification patch table 122 is a table described with reference to FIG. 7, in which a color (ink) used as an identification patch and information indicated by the color are associated with each other. For example, as illustrated in FIG. 7, information of number 1 to information of number 7 are associated with cyan, magenta, yellow, red, green, blue, and black in order. The set value for each of the set items of the printing conditions described above is represented by a color of an identification patch or a combination of colors of a plurality of identification patches.

The non-volatile memory 12 also stores a numerical conversion table 123. The numerical conversion table 123 is a table, in which the set value corresponding to each of the set items is converted to a numerical value stored in the identification patch table 122, and enables the set value and the numerical value to be associated with each other.

Further, in the identification patch table 122, the ink used as an identification patch is limited to colored ink that is not replaceable with ejection liquid other than colored ink used in color printing. That is, the identification patches of the color chart sheet 30 are patches printed with colored ink that is not replaceable with ejection liquid other than colored ink. Thereby, it is possible to avoid the situation where, for example, ink to be used as an identification patch is replaced with penetrant liquid and the identification patch is not formed in an assumed color.

The communication section 13 includes a communication interface for communicating with external devices in accordance with various wired or wireless communication protocols. The information processing apparatus 10 is able to communicate with the printing apparatus 20 via the communication section 13.

The UI section 14 includes a display section, a keyboard, a mouse, and the like. The processor 11 is able to obtain operation content of the user via the UI section 14. The processor 11 is also able to display various kinds of information on the display section of the UI section 14 and notify the user of the information.

The processor 11 performs processing of controlling printing of the color chart sheet 30 by the printing apparatus 20. Therefore, the processor 11 functions as a print data generating section 111 and a printing control section 112 by executing programs recorded on the non-volatile memory 12.

The print data generating section 111 functions to generate image data of the color chart sheet 30 based on the pattern data 121 or the like. The processor 11 performs the following processing with the function of the print data generating section 111. That is, the processor 11 arranges color patches in image data based on information for associating the arrangement positions of the color patches in the pattern data 121 with the nozzle arrays that from the respective patches.

Further, the processor 11 arranges identification patches in the image data with the following processing. First, the processor 11 obtains printing conditions of the respective color charts 301 to 304 included in the color chart sheet 30, that is, set values for the respective set items of the printing conditions. Of the printing conditions, a voltage offset is input by operation of the user. The other printing conditions are stored in the non-volatile memory 12 or the like in advance.

By referring to the pattern data 121, the processor 11 specifies an arrangement position of an identification patch associated with each of the set items of the printing conditions. Further, by referring to the numerical conversion table 123, the processor 11 converts each of the set values of the printing conditions to a numerical value. In addition, by referring to the identification patch table 122, the processor 11 specifies a color corresponding to the numerical value for the set item of each of the printing conditions. The processor 11 then arranges the identification patch of the specified color at the corresponding arrangement position. Thereby, the identification patch corresponding to the printing condition is arranged. For example, when obtaining the set value of the dot size S, the processor 11 specifies the arrangement position 45 corresponding to the dot size by referring to the pattern data 121. Further, the processor 11 converts the dot size S to a numerical value by referring to the numerical conversion table 123 and specifies a color indicating the numerical value by referring to the identification patch table 122. The processor 11 then arranges the identification patch of the specified color at the arrangement position 45 in the image data.

As described above, the respective color charts included in the color chart sheet 30 generated with the function of the print data generating section 111 differ from each other in at least one of the color and the arrangement of the identification patches depending on the printing conditions. That is, the color charts differ from each other depending on the printing conditions. The processor 11 further converts the image data to print data that is able to be interpreted by the printing apparatus 20.

The printing control section 112 functions to enable the printing apparatus 20 to print the print data of the color chart sheet 30 generated with the function of the print data generating section 111. The processor 11 transmits, with the function of the printing control section 112, the print data of the color chart sheet 30 to the printing apparatus 20 via the communication section 13 and thereby enables the printing apparatus 20 to print the print data.

Next, the colorimeter 40 will be described. In the present embodiment, a color measurement object of the colorimeter 40 is defined as an A4-size color chart. Therefore, the user cuts an A2-size color chart sheet 30 to two in both the vertical and horizontal directions to obtain four A4-size color charts 301 to 304. The colorimeter 40 measures colors of the color charts 301 to 304. The colorimeter 40 measures the colors of the color charts as measurement objects under a given condition and calculates respective values (L*a*b*) in an L*a*b* color space of each of the patches.

The results of color measurement on the color charts obtained by the colorimeter 40 are input to the adjusting apparatus 50. The color measurement results are obtained by associating the positions of the patches and the results of color measurement on the patches. The results of color measurement on the color charts are recorded on a detachably attachable recording medium such as a USB, and when the recording medium is attached to the adjusting apparatus 50, the results are read by the adjusting apparatus 50. Note that processing of transmitting the results of color measurement on the color charts is not limited to that in the embodiment as long as the results are transmitted from the colorimeter 40 to the adjusting apparatus 50. As another example, when the colorimeter 40 includes a communication section, the colorimeter 40 may transmit the results of color measurement on the color charts to the adjusting apparatus 50 by performing wireless or wired communication.

Figure 9:
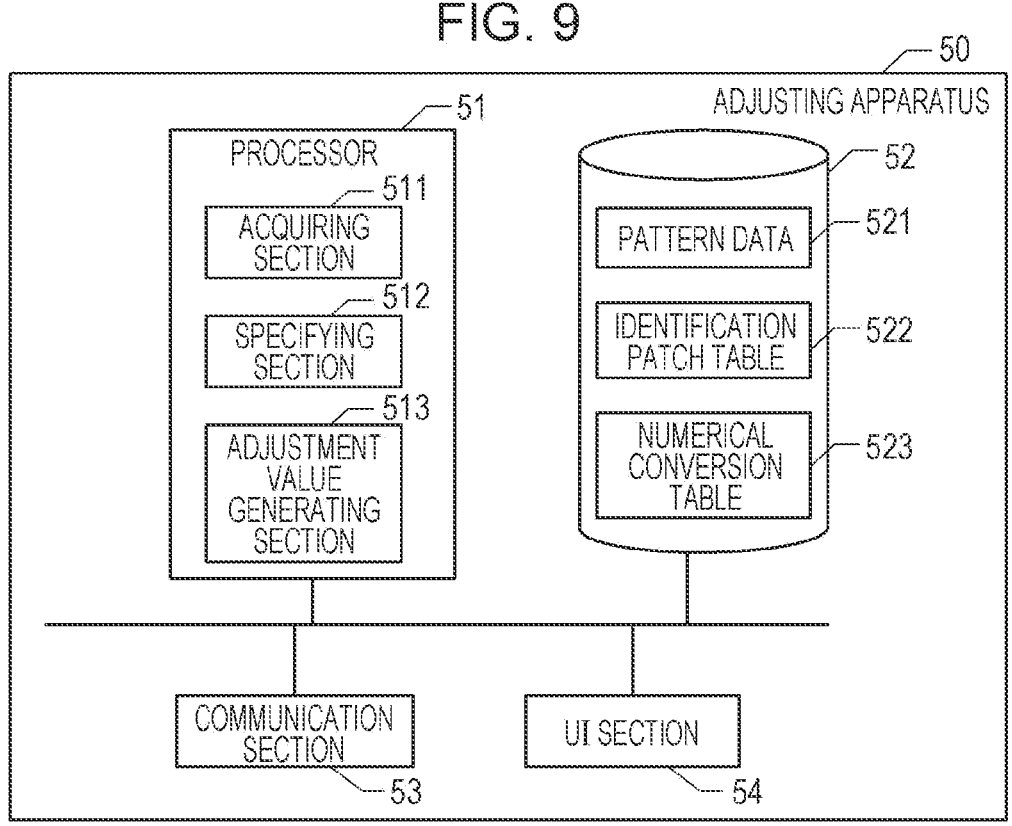
FIG. 9 illustrates a configuration of an adjusting apparatus.

FIG. 9 illustrates a configuration of the adjusting apparatus 50. The adjusting apparatus 50 includes a processor 51, non-volatile memory 52, a communication section 53, and a UI section 54. The processor 51 includes a CPU, a ROM, a RAM, and the like (none of which is illustrated) and is able to control the respective sections of the adjusting apparatus 50 by executing various programs recorded on the non-volatile memory 52. Note that the processor 51 may be constituted by a single chip or a plurality of chips. Moreover, the processor 51 may adopt, for example, an ASIC instead of the CPU or may be constituted by cooperation of the CPU and an ASIC.

The non-volatile memory 52 stores pattern data 521, an identification patch table 522, and a numerical conversion table 523. The pattern data 521, the identification patch table 522, and the numerical conversion table 523 are respectively similar to the pattern data 121, the identification patch table 122, and the numerical conversion table 123 of the information processing apparatus 10.

The communication section 53 includes a communication interface for communicating with external devices in accordance with various wired or wireless communication protocols. The communication section 53 includes an interface for communicating with various kinds of removable memory attached to the adjusting apparatus 50.

The UI section 54 includes a display section, a keyboard, a mouse, and the like. The processor 51 is able to obtain operation content of the user via the UI section 54. The processor 51 is also able to display various kinds of information on the display section of the UI section 54 and notify the user of the information.

The processor 51 performs processing of generating an adjustment value used for the adjusting apparatus 50 to perform voltage adjustment. Therefore, the processor 51 functions as an acquiring section 511, a specifying section 512, and an adjustment value generating section 513 by executing an adjustment program (not illustrated) recorded on the non-volatile memory 52.

The acquiring section 511 functions to acquire the result of color measurement on the color chart sheet 30. When a detachably attachable recording medium is attached to the adjusting apparatus 50, the processor 51 acquires, with the function of the acquiring section 511, the color measurement result from the recording medium via the communication section 53.

The specifying section 512 functions to specify, based on the result of color measurement on a color chart, a printing condition of the color chart. The processor 51 performs the following processing with the function of the specifying section 512. Based on a correspondence relationship between the arrangement positions of the identification patches and the set items of the printing conditions indicated by the pattern data 121, the processor 51 specifies the arrangement positions corresponding to the respective set items. The processor 51 converts the result of color measurement in each of the arrangement positions to a numerical value by referring to the identification patch table 522 and further specifies a set value from the numerical value by referring to the numerical conversion table 523. For example, the processor 51 specifies the arrangement position 45 associated with the dot size and specifies whether the dot size is S or L in accordance with the value of color measurement on the identification patch at the arrangement position 45.

Figure 10:
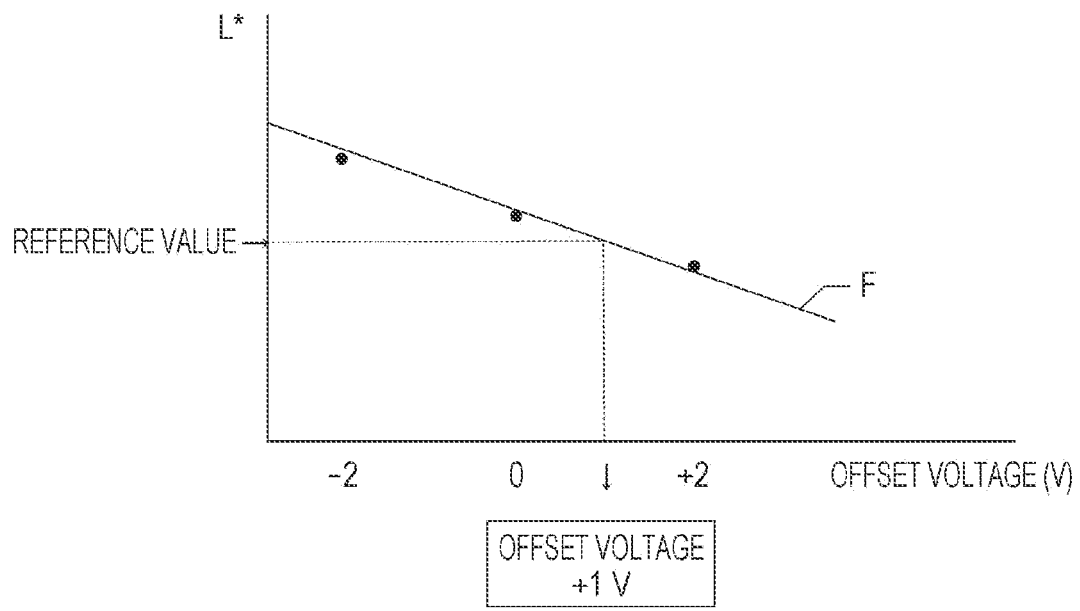
FIG. 10 is a view for explaining adjustment value generation processing.

The adjustment value generating section 513 functions to generate an adjustment value of the voltage corresponding to the ejection amount of the ink based on the printing conditions specified with the function of the specifying section 512. The processor 51 specifies the color measurement results for the cases in which the voltage values are −2 V, 0 V, and +2 V while an identical dot size and an identical nozzle array are set based on the printing conditions. The processor 51 then obtains, based on the color measurement results, a relational expression of a value of the color set in advance for each of the nozzle arrays and an offset voltage and obtains, as the offset voltage, the voltage obtained by substituting a reference value corresponding to the color that is set in advance in the relational expression. For example, it is assumed that L* is associated with the target nozzle array. In this case, as illustrated in FIG. 10, the processor 51 obtains a relational expression F based on the color measurement results of L* for the cases in which the offset voltage values are −2 V, 0 V, and +2 V. The processor 51 then specifies the offset voltage (+1 V) based on the relational expression F and the reference value of L* that is set in advance.

As described above, in the printing adjusting system 1 according to the present embodiment, an identification patch indicating a printing condition is included in a color patch, and the adjusting apparatus 50 is able to specify the printing condition based on the position and color measurement result of the identification patch. Thus, it is possible to save time and effort for the user to manually input the printing condition corresponding to the color measurement result to input the color measurement result to the adjusting apparatus 50. Further, since such a user operation is unnecessary, there is no possibility of erroneous input.

(2) Printing Processing

Figure 11:
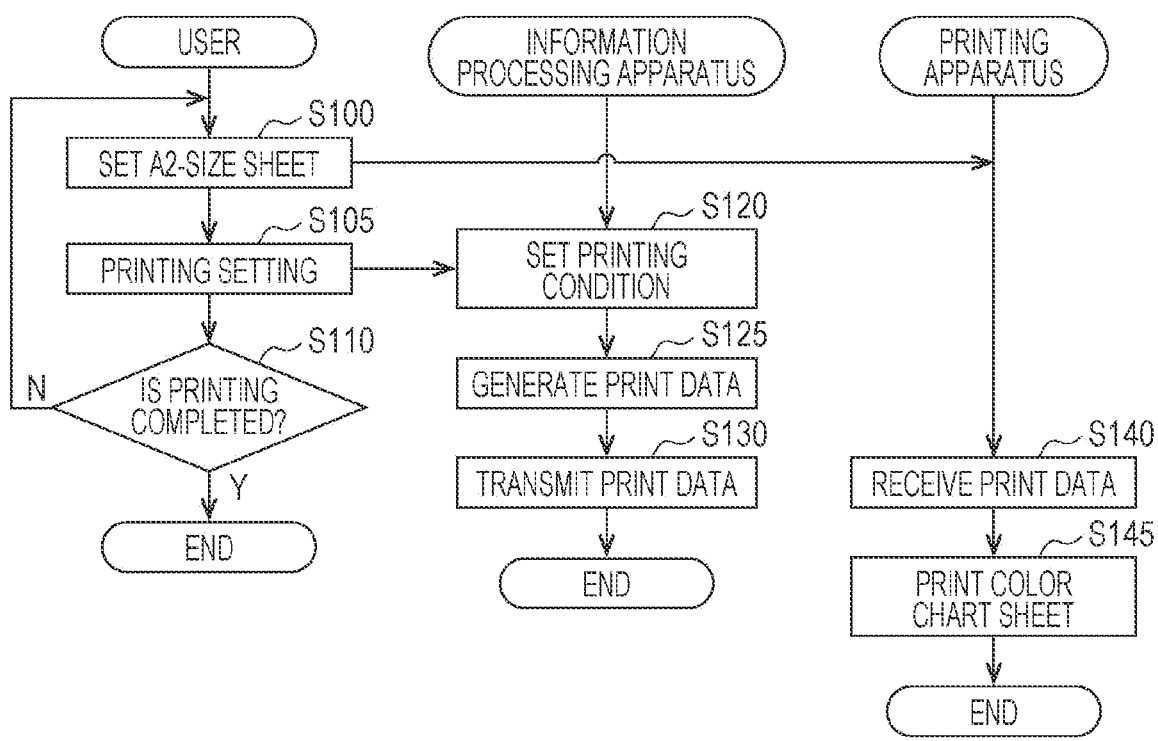
FIG. 11 is a flowchart illustrating printing processing.

FIG. 11 is a flowchart illustrating printing processing of the color chart sheet 30. Note that the left-side flowchart in FIG. 11 indicates operation of the user. The middle flowchart in FIG. 11 indicates processing of the information processing apparatus 10. The right-side flowchart in FIG. 11 indicates processing of the printing apparatus 20.

First, the user sets, in the printing apparatus 20, an A2-size sheet (printing medium) for printing the color chart sheet 30 (step S100). Next, the user operates the information processing apparatus 10 to cause the display section of the UI section 14 of the information processing apparatus 10 to display a printing set screen. The user then performs printing setting on the printing set screen (step S105). Specifically, the user sets any of the voltage values −2 V, 0 V, and +2 V to be applied to the piezoelectric element and presses a print button. In response to the user operation, the processor 11 of the information processing apparatus 10 sets the printing condition (step S120). Next, the processor 11 of the information processing apparatus 10 generates, with the function of the print data generating section 111, print data of the color chart sheet 30 that includes the identification patch according to the printing condition (step S125). Next, the processor 11 of the information processing apparatus 10 transmits the print data to the printing apparatus 20 via the communication section 13 with the function of the printing control section 112 (step S130).

In response to the processing of the information processing apparatus 10, the processor 21 of the printing apparatus 20 receives the print data from the information processing apparatus 10 via the communication section 23 (step S140). Next, the processor 21 of the printing apparatus 20 prints the color chart sheet 30 on the A2-size sheet based on the print data (step S145).

When color chart sheets 30 regarding the three voltages of −2 V, 0 V, and +2 V are obtained (Y in step S110), the user ends the printing processing. On the other hand, when printing is not completed, that is, color chart sheets 30 corresponding to all the voltages are not obtained (N in step S110), the procedure proceeds to step S100. That is, the user additionally sets an A2-size sheet, sets, in the information processing apparatus 10, the voltage that is not subjected to the processing, and repeats the subsequent processing.

(3) Color Measurement Processing

Figure 12:
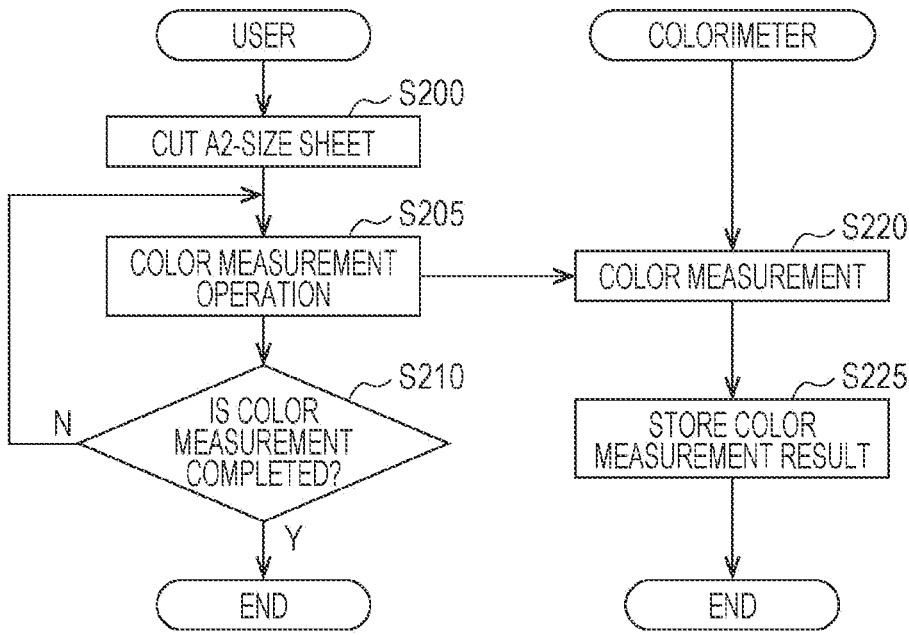
FIG. 12 is a flowchart illustrating color measurement processing.

FIG. 12 is a flowchart illustrating color measurement processing for obtaining a color measurement value of the color chart sheet 30. The color measurement processing is performed after the printing processing is completed. The left-side flowchart in FIG. 12 indicates operation of the user. The right-side flowchart in FIG. 12 indicates processing of the colorimeter 40.

First, the user cuts each of three A2-size color charts obtained through the printing processing to four (step S200). Next, the user performs a color measurement operation (step S205). Specifically, the user performs, for example, operation of controlling a light source so as to satisfy a radiation condition that is set in advance. After the color measurement operation is completed, the colorimeter 40 performs color measurement on one color chart that has been cut (step S220). Next, the colorimeter 40 stores the color measurement result in a storage section such as the ROM or the non-volatile memory included in the colorimeter 40 (step S225).

After completing color measurement on all the twelve color charts in total obtained by cutting (Y in step S210), the user ends the color measurement processing. When a color chart color measurement on which is not completed remains (N in step S210), the user shifts the procedure to step S205. That is, the user performs the color measurement operation on a color chart not subjected to color measurement and repeats the subsequent processing.

(4) Adjustment Value Generation Processing

Figure 13:
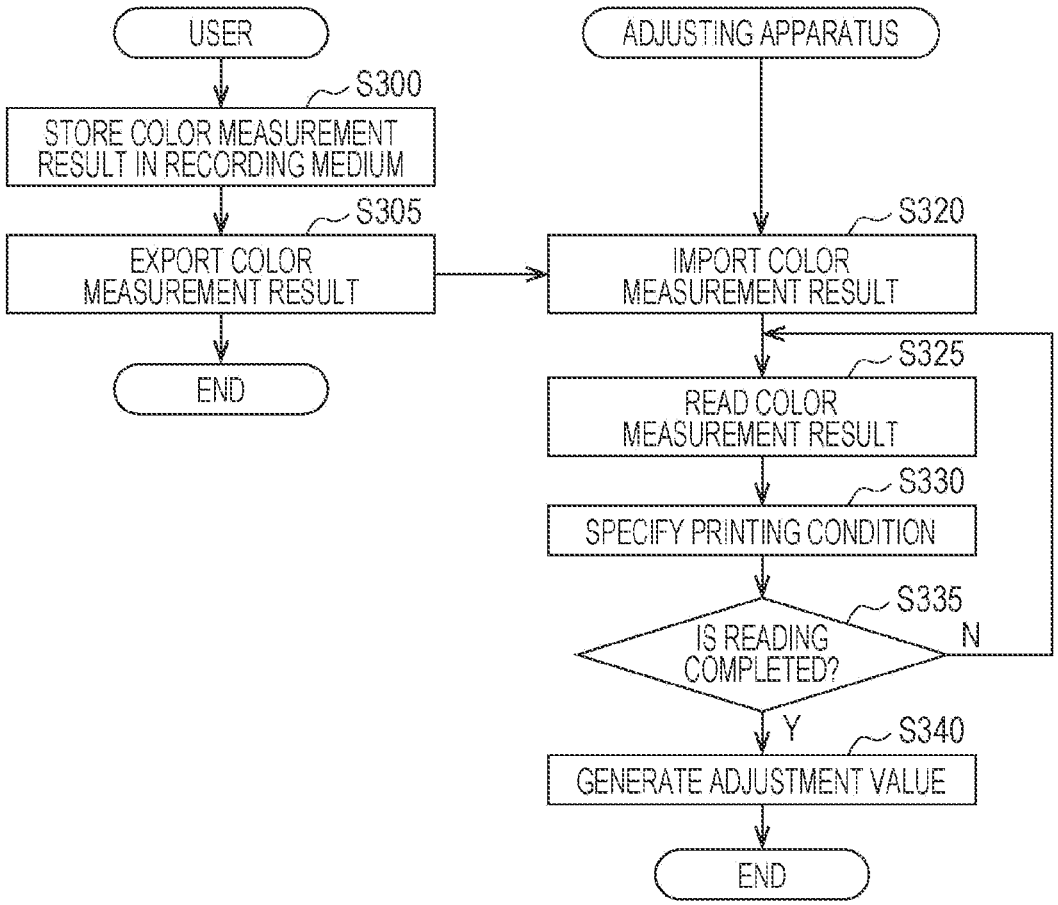
FIG. 13 is a flowchart illustrating adjustment value generation processing.

FIG. 13 is a flowchart illustrating adjustment value generation processing for generating an adjustment value of the voltage applied to the piezoelectric element of the printing apparatus 20. The adjustment value generation processing is performed after the color measurement processing is completed. The left-side flowchart in FIG. 13 indicates operation of the user. The right-side flowchart in FIG. 13 indicates processing of the adjusting apparatus 50.

In the adjustment value generation processing, first, the user attaches a detachably attachable recording medium to the colorimeter 40 and stores the color measurement result in the recording medium (step S300). Next, the user exports the color measurement result stored in the recording medium to the adjusting apparatus 50 (step S305). Specifically, the user attaches, to the adjusting apparatus 50, the recording medium on which the color measurement result is recorded. On the other hand, the processor 51 of the adjusting apparatus 50 imports the color measurement result stored in the recording medium attached to the adjusting apparatus 50 (step S320). Specifically, the processor 51 acquires the color measurement result with the function of the acquiring section 511 and stores the color measurement result in the storage section such as the ROM. Next, the processor 51 reads the color measurement result corresponding to one color chart (step S325).

Next, the processor 51 specifies a printing condition based on the color measurement result with the function of the specifying section 512 (step S330). When the color measurement result that has not been read remains (N in step S335), the processor 51 shifts the procedure to step S325. That is, in this case, the processor 51 reads the color measurement result that has not been read (step S325) and continues the subsequent processing. On the other hand, when reading of all the color measurement results, that is, the results of color measurement on the twelve color charts is completed (Y in step S335), the processor 51 generates a voltage adjustment value based on the color measurement result corresponding to each of the printing conditions with the function of the adjustment value generating section 513 (step S340). Then, the adjustment value generation processing is completed.

(5) Other Embodiments

The aforementioned embodiment is an example for carrying out the disclosure, and various embodiments are also able to be adopted. For example, the information processing apparatus 10 and the adjusting apparatus 50 may be integrally provided. That is, the processor 11 may use a printer driver of the information processing apparatus 10 to adjust a color conversion table set to the information processing apparatus 10. Moreover, the colorimeter 40 and the adjusting apparatus 50 may be integrally provided. The adjusting apparatus 50 and the printing apparatus 20 may be integrally provided.

Although chip identification numbers as an adjustment target chip group are used to identify a chip in accordance with the printing condition in the present embodiment, for example, information for identifying a nozzle array may be arranged as an identification patch. Note that, in this case, it is defined that identification information for identifying a nozzle array is assigned to each of the nozzle arrays.

The printing conditions are not required to include all of a dot size, a voltage applied to the printing head, a nozzle array, and model identification information of the printing apparatus and may include at least one of them. The positions at which identification patches indicating set values corresponding to the set items of the printing conditions are arranged and the number of identification patches used for indicating the set values may be determined in advance and are not particularly limited. The set value of each of the printing conditions may be represented by any of a color of an identification patch, the number of identification patches, a combination of colors of identification patches, and arrangement order of colors of identification patches.

Although an identification patch is arranged on the left side of a color chart in the present embodiment, the arrangement position of the identification patch is not limited to that in the embodiment as long as the adjusting apparatus 50 is able to recognize the arrangement position of the identification patch. As another example, the identification patch may be arranged on the left side or the lower side of a color chart. As still another example, an identification patch may be inserted between color charts.

Although the printing apparatus 20 prints a color chart sheet including a plurality of color charts in the present embodiment, the printing apparatus 20 may print one color chart on one printing medium. Also in this case, it is defined that the color chart includes an identification patch and a color patch.

Although the printing condition is indicated by arranging not only a color patch but also an identification patch in a color chart in the present embodiment, the printing condition may be indicated by arranging no color patch at a given position among arrangement positions of color patches, as another example. For example, no color patch may be arranged at a plurality of positions, and the set value corresponding to the printing condition may be represented by a combination of the plurality of positions. Note that, in this case, it is defined that a color patch that is not arranged is to be arranged in another region. Note that, in this case, it is defined that the information processing apparatus 10 and the adjusting apparatus 50 store information indicating a correspondence relationship between a combination of positions at which no color patch is arranged and the set value of the printing condition. The information processing apparatus 10 generates a color chart in which a color patch is absent in accordance with the printing condition by referring to the information, and the adjusting apparatus 50 specifies the printing condition based on the result of color measurement on the color chart in which a color patch is absent.

Further, the disclosure is applicable as a program or method executed by a computer. Moreover, the aforementioned system, program, and method may be implemented by using a single device or may be implemented by using components included in a plurality of apparatuses and include various aspects. Further, the aforementioned system, program, and method can be changed appropriately as in a case in which a portion thereof is software and a portion thereof is hardware. Furthermore, the disclosure is established as a recording medium of a program controlling a system. Of course, the recording medium of the program may be a magnetic recording medium or semiconductor memory, and any recording medium to be developed in the future can be similarly considered.

What is claimed is:

1. An information processing apparatus comprising:
   a print data generating section that generates print data of a color chart in which a plurality of patches are arranged and which includes an identification patch indicating a printing condition of a printing apparatus when the color chart is printed; and
   a printing control section that enables the printing apparatus to print the print data of the color chart that varies depending on the printing condition,
   wherein the identification patch is a patch printed with colored ink that is not replaceable with ejection liquid other than colored ink used in color printing.

2. The information processing apparatus according to claim 1, wherein
   the color chart includes a color patch, which is used to adjust an ejection amount of ink ejected from a nozzle array included in a printing head of the printing apparatus, and the identification patch.

3. The information processing apparatus according to claim 2, wherein
   the printing condition is indicated by a color of the identification patch.

4. The information processing apparatus according to claim 2, wherein
   the printing condition is indicated by a combination of colors of a plurality of identification patches.

5. The information processing apparatus according to claim 2, wherein
   the printing condition is indicated by a position of the identification patch in the color chart.

6. The information processing apparatus according to claim 2, wherein
   the printing condition includes a condition about whether or not ejection liquid other than colored ink used in color printing is used for printing the color patch.

7. The information processing apparatus according to claim 1, wherein
   the printing condition includes at least one of a dot size when the color chart is printed, a voltage applied to a printing head of the printing apparatus, a nozzle array of the printing head, a chip of the printing head, and model identification information of the printing apparatus.

8. An adjusting apparatus comprising:
   an acquiring section that acquires a reading result by a colorimeter regarding a color chart in which a plurality of patches are arranged and which varies depending on a printing condition of the color chart, wherein the color chart includes an identification patch indicating a printing condition of a printing apparatus when the color chart is printed, and the identification patch is a patch printed with colored ink that is not replaceable with ejection liquid other than colored ink used in color printing;
   a specifying section that specifies, based on a result acquired by the acquiring section, the printing condition; and
   an adjustment value generating section that generates, based on the printing condition, an adjustment value of an ejection amount of ink ejected from a nozzle array of a printing head.

9. An information processing method comprising:
   a print data generating step of generating print data of a color chart in which a plurality of patches are arranged and which includes an identification patch indicating a printing condition of a printing apparatus when the color chart is printed, wherein the identification patch is a patch printed with colored ink that is not replaceable with ejection liquid other than colored ink used in color printing; and a printing control step of enabling the printing apparatus to print the print data of the color chart that varies depending on the printing condition.

10. An adjusting method comprising:

an acquiring step of acquiring a reading result by a colorimeter regarding a color chart in which a plurality of patches are arranged and which includes an identification patch indicating a printing condition of a printing apparatus when the color chart is printed, wherein the identification patch is a patch printed with colored ink that is not replaceable with ejection liquid other than colored ink used in color printing;

a specifying step of specifying, based on a result acquired in the acquiring step, the printing condition; and an adjusting step of adjusting, based on the printing condition, an amount of ink ejected from a nozzle array of a printing head.

11. A non-transitory computer-readable storage medium storing a program, the program causing a computer to function as:

a print data generating section that generates print data of a color chart in which a plurality of patches are arranged and which includes an identification patch indicating a printing condition of a printing apparatus when the color chart is printed, wherein the identification patch is a patch printed with colored ink that is not replaceable with ejection liquid other than colored ink used in color printing; and a printing control section that enables the printing apparatus to print the print data of the color chart that varies depending on the printing condition.

12. A non-transitory computer-readable storage medium storing a program, the program causing a computer to function as:

an acquiring section that acquires a reading result by a colorimeter regarding a color chart in which a plurality of patches are arranged and which includes an identification patch indicating a printing condition of a printing apparatus when the color chart is printed, wherein the identification patch is a patch printed with colored ink that is not replaceable with ejection liquid other than colored ink used in color printing;

a specifying section that specifies, based on a result acquired by the acquiring section, the printing condition; and an adjusting section that adjusts, based on the printing condition, an amount of ink ejected from a nozzle array of a printing head.

* * * * *